(12) United States Patent
Scheller et al.

(10) Patent No.: US 7,199,579 B2
(45) Date of Patent: Apr. 3, 2007

(54) PROXIMITY DETECTOR

(75) Inventors: Karl Scheller, Bow, NH (US);
Gerardo Monreal, Buenos Aires (AR);
Jason Stauth, Berkley, CA (US)

(73) Assignee: Allegro Microsystems, Inc., Worcester, MA (US)

( * ) Notice: Subject to any disclaimer, the term of this patent is extended or adjusted under 35 U.S.C. 154(b) by 173 days.

(21) Appl. No.: 10/795,930

(22) Filed: Mar. 8, 2004

(65) Prior Publication Data
US 2005/0194970 A1    Sep. 8, 2005

(51) Int. Cl.
*G01B 7/14* (2006.01)

(52) U.S. Cl. .................................. 324/207.26

(58) Field of Classification Search ........... 324/207.26, 324/207.15, 207.21, 207.2, 166–180, 251–253; 341/15, 156, 145
See application file for complete search history.

(56) References Cited

U.S. PATENT DOCUMENTS

| | | | |
|---|---|---|---|
| 5,442,283 A | 8/1995 | Vig et al. | |
| 5,451,946 A * | 9/1995 | Smith et al. | 341/118 |
| 5,650,719 A * | 7/1997 | Moody et al. | 324/166 |
| 5,694,038 A * | 12/1997 | Moody et al. | 324/207.2 |
| 5,729,130 A | 3/1998 | Moody et al. | |
| 5,781,005 A * | 7/1998 | Vig et al. | 324/207.2 |
| 5,801,655 A * | 9/1998 | Imamura | 341/145 |
| 5,917,320 A | 6/1999 | Scheller et al. | |
| 6,091,239 A | 7/2000 | Vig et al. | |
| 6,100,680 A * | 8/2000 | Vig et al. | 324/207.2 |
| 6,232,768 B1 * | 5/2001 | Moody et al. | 324/207.12 |
| 6,297,627 B1 | 10/2001 | Towne et al. | |
| 6,317,067 B1 * | 11/2001 | Mohindra | 341/145 |
| 6,693,419 B2 | 2/2004 | Stauth et al. | |
| 2005/0146322 A1 * | 7/2005 | Hoffman et al. | 324/207.12 |

* cited by examiner

*Primary Examiner*—Edward Lefkowitz
*Assistant Examiner*—Kenneth J. Whittington
(74) *Attorney, Agent, or Firm*—Daly, Crowley, Mofford & Durkee, LLP

(57) ABSTRACT

A proximity detector includes a fine DAC and a coarse DAC, outputs of which are summed to provide a tracking signal for tracking a magnetic field signal. The proximity detector provides two mode of operation. In a first mode of operation the coarse and fine DACs operate in combination as one higher order DAC. In a second mode of operation, the coarse DAC is provided with one or more extra counts, allowing the tracking signal to move more rapidly to track a rapidly changing magnetic field signal. In another embodiment, the proximity detector also includes an offset circuit for bringing at least one of the magnetic field signal and the tracking signal towards the other one of the magnetic field signal and the tracking signal.

8 Claims, 7 Drawing Sheets

PROXIMITY DETECTOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates to proximity detectors and more particularly to a proximity detector that provides close tracking of a magnetic field signal.

BACKGROUND OF THE INVENTION

Proximity detectors for detecting ferrous or magnetic articles are known. One application for such devices is in detecting the approach and retreat of each tooth of a rotating ferrous gear. The magnetic field associated with the ferrous article is detected by a magnetic field-to-voltage transducer, such as a Hall element or a magnetoresistive device, which provides a signal proportional to a detected magnetic field (i.e., a magnetic field signal). The proximity detector processes the magnetic field signal to generate an output signal that changes state each time the magnetic field signal crosses a threshold signal.

In one type of proximity detector, sometimes referred to as a peak-to-peak percentage detector, the threshold signal is equal to a percentage of the peak-to-peak magnetic field signal. One such peak-to-peak percentage detector is described in U.S. Pat. No. 5,917,320 entitled DETECTION OF PASSING MAGNETIC ARTICLES WHILE PERIODICALLY ADAPTING DETECTION THRESHOLD and assigned to the assignee of the present invention.

Another type of proximity detector, sometimes referred to as a slope-activated or a peak-referenced detector is described in U.S. Pat. No. 6,091,239 entitled DETECTION OF PASSING MAGNETIC ARTICLES WITH A PEAK REFERENCED THRESHOLD DETECTOR, which is assigned to the assignee of the present invention. Another such peak-referenced proximity detector is described in U.S. patent application entitled PROXIMITY DETECTOR, filed on May 28, 2002, and assigned application Ser. No. 10/156,684, which is assigned to the assignee of the present invention and incorporated herein by reference. In the peak-referenced proximity detector, the threshold signal differs from the positive and negative peaks (i.e., the peaks and valleys) of the magnetic field signal by a predetermined amount. Thus, in this type of proximity detector, the output signal changes state when the magnetic field signal comes away from a peak or valley by the predetermined amount.

In order to accurately detect the proximity of a ferrous article, the proximity detector must be capable of closely tracking the magnetic field signal. Typically, one or more digital-to-analog converters (DACs) are used to generate a signal which tracks the magnetic field signal. For example, in the above-referenced U.S. Pat. Nos. 5,917,320 and 6,091,239, two DACs are used; one to track the positive peaks of the magnetic field signal (PDAC) and the other to track the negative peaks of the magnetic field signal (NDAC).

Referring to FIG. 1, a peak-referenced proximity detector 10 is shown which uses a single DAC 28 to track a magnetic field signal, DIFF. A Hall element 14 generates a differential signal proportional to an ambient magnetic field, which signal is amplified by an amplifier 16 to provide the DIFF signal. The DIFF signal is coupled to a non-inverting input of a tracking comparator 20 which also receives, at an inverting input, the output signal, PEAKDAC, of the DAC 28. The DIFF signal is further coupled to a non-inverting input of a comparator 40 which also receives, at an inverting input, the PEAKDAC signal, and which generates a POSCOMP output signal. The comparator 40 has hysteresis, here on the order of 100 mV, so that the POSCOMP signal changes state when the DIFF signal exceeds the PEAKDAC signal by approximately 100 mV. The COMPOUT output signal of the comparator 20 is coupled to an exclusive OR (XOR) gate 36, which additionally receives the POSCOMP signal, and which provides a HOLD input signal to an up/down counter 24. The counter 24 is further responsive to a clock signal, CLK, and to the POSCOMP signal for controlling whether the counter 24 counts up or down. The output of the counter 24 is converted into the PEAKDAC tracking signal by the DAC 28.

As is illustrated in FIG. 2, whenever the DIFF signal exceeds the PEAKDAC signal by the hysteresis level of the comparator 20, such as by 10 mV, the COMPOUT signal transitions to a logic high level, thereby causing the counter 24 to count if the POSCOMP signal is also high. Once the counter 24 counts up one step, the COMPOUT signal goes low causing the count value to be held until the DIFF signal exceeds the PEAKDAC signal by 10 mV again. When the DIFF signal reaches a positive peak, as occurs at time $t_1$, the PEAKDAC signal stays above the DIFF signal, thereby causing the HOLD input to the counter 24 to be asserted until the hysteresis of the comparator 40 has been overcome, as occurs when the POSCOMP signal goes low, just before time $t_2$.

When the DIFF signal changes more rapidly as occurs beginning at time $t_3$, the PEAKDAC signal is not able to keep up with the fast changing DIFF signal. More particularly, the DAC 28 counts at its maximum rate (i.e., the PEAKDAC signal experiences its maximum slope, dV/dt) after the POSCOMP signal transitions, such as at times $t_0$, $t_2$, $t_3$, $t_4$, and $t_6$. Between times $t_4$ and $t_5$, the DIFF signal has a slope greater than the maximum dV/dt of the DAC and the PEAKDAC signal does not catch up with the falling DIFF signal until time $t_5$ when the DIFF signal is rising. In this case, the DIFF signal valley occurring between times $t_4$ and $t_5$ is not detected, thereby causing a transition of the POSCOMP signal to be delayed. It will be appreciated that an even faster changing DIFF signal can result in a transition of the POSCOMP signal being skipped and a passing magnetic article to go undetected. It will also be appreciated that the same potential problem of skipping POSCOMP signal transitions can occur when the DIFF signal has a rapidly decreasing or rapidly increasing amplitude, since the PEAKDAC signal will not have time to catch the DIFF signal before it changes direction.

Also, it should be recognized that the DAC 28 (FIG. 1) converts from a digital to an analog signal in a conversion time, which may be a significant amount of time relative to a clock period applied by the counter 24 (FIG. 1) to the DAC 28. Therefore, it should be recognized that the conversion time of the DAC 28 can also limit the ability of the PEAKDAC signal to keep up with a rapidly changing DIFF signal when the DAC 28 cannot convert in a clock period. Furthermore, it is generally known that DACs with more bits require greater conversion times. Therefore, in order for the PEAKDAC signal to keep up with a rapidly changing DIFF signal, the number of DAC bits can be limited, for example, to eight bits. However, having only eight bits, the conventional proximity detector of FIG. 1 can experience undesirable jitter of the PEAKDAC signal edges, and therefore, undesirable jitter of the POSCOMP signal edges, resulting in a reduced accuracy of the proximity detector.

It would, therefore, be desirable to overcome the aforesaid and other disadvantages, and to provide a proximity detector able to accurately detect a ferrous article moving at a high rate and to reduce signal edge jitter.

SUMMARY OF THE INVENTION

In accordance with the present invention, a proximity detector includes a magnetic-field-to-voltage transducer for providing a magnetic field signal indicative of an ambient magnetic field, and a peak detector responsive to the magnetic field signal for providing a tracking signal which substantially follows at least a portion of the magnetic field signal. The peak detector includes first and second digital-to-analog converters, wherein the first digital-to-analog converter has a first output signal with a first step size and the second digital-to-analog converter has a second output signal with a second step size larger then the first step size. The proximity detector also includes a summation circuit for adding together the first and the second signals to provide the tracking signal.

The proximity detector provides two mode of operation. In a first mode of operation the coarse and fine DACs operate in combination as one higher order DAC. In a second mode of operation, the coarse DAC is provided with one or more extra counts, allowing the tracking signal to move more rapidly to track a rapidly changing magnetic field signal.

In accordance with another aspect of the present invention, a method for detecting a ferrous article includes generating a magnetic field signal indicative of an ambient magnetic field and generating a tracking signal which substantially follows at least a portion of the magnetic field signal. The method also includes generating a too-far-behind signal which changes state when the magnetic field signal varies from the tracking signal by a predetermined amount, and changing a step size of the tracking signal in response to transitions of the too-far-behind signal. In one particular embodiment, changing step size includes generating a first output signal having a first step size with a first digital-to-analog converter, generating a second output signal with a second step size larger then the first step size with a second digital-to-analog converter, and summing together the first and the second output signals to provide the tracking signal.

With this particular arrangement, a proximity detector and method for detecting a ferrous article are provided which can accurately track a rapidly changing magnetic field signal and for which signal edge jitter is reduced.

BRIEF DESCRIPTION OF THE DRAWINGS

The foregoing features of this invention, as well as the invention itself may be more fully understood from the following description of the drawings in which.

DETAILED DESCRIPTION OF THE INVENTION

Figure 3:
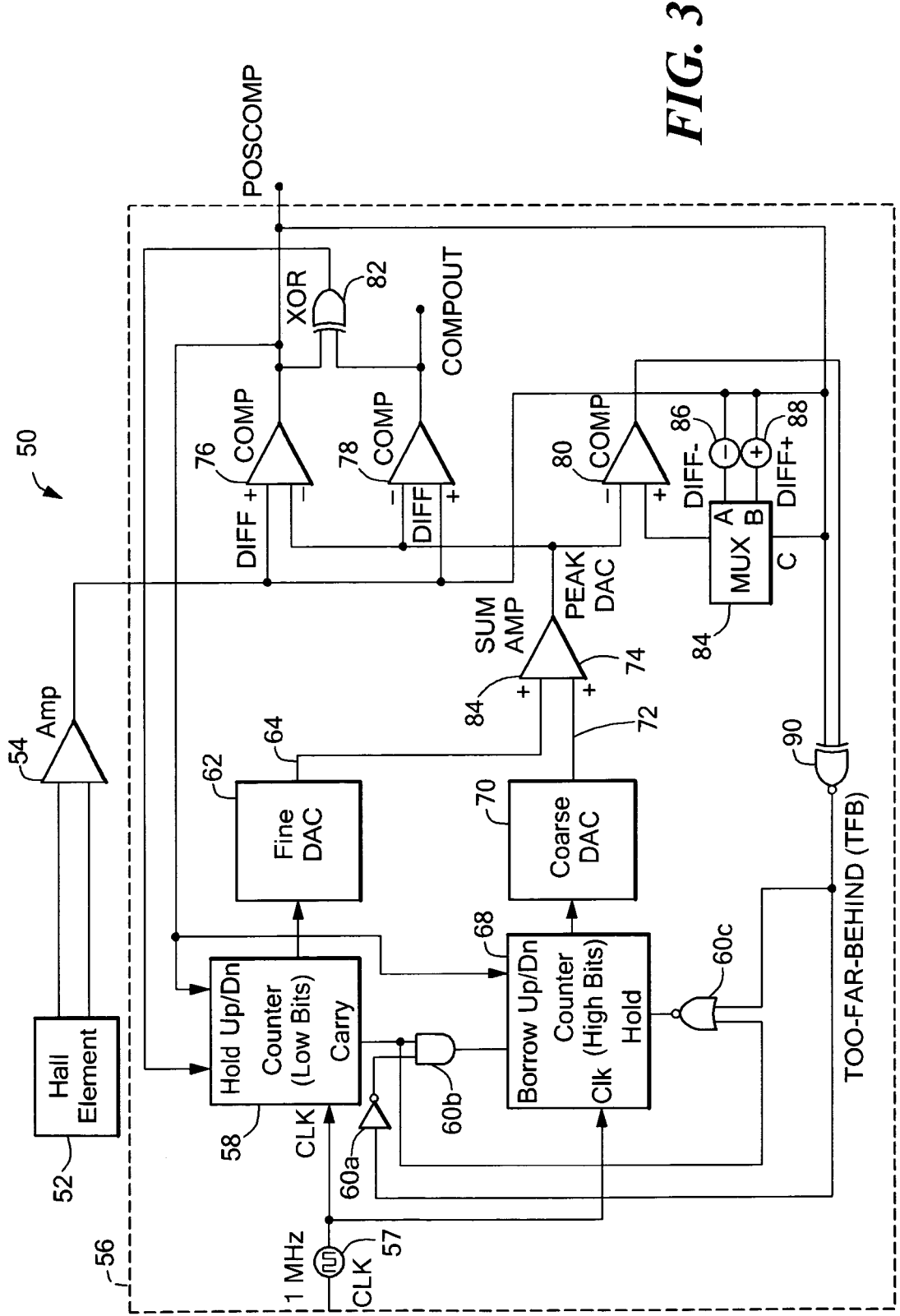
FIG. 3 is a block diagram of a Hall effect proximity detector including two counters and two DACS according to the present invention.

Referring to FIG. 3, a proximity detector 50 includes a magnetic-field-to-voltage transducer 52 coupled to an amplifier 54, for providing a magnetic field signal, DIFF, indicative of an ambient magnetic field. In one particular embodiment, the magnetic field transducer 52 is a Hall effect element. However, other types of magnetic field transducers can be used with this invention, including but not limited to a magnetoresistive device. The proximity detector 50 also includes a peak detector circuit 56 having a first counter 58 and a fine DAC 62 for providing a first output signal 64 having a first step size, and a second counter 68 and a coarse DAC 70 for providing a second output signal 72 having a second step size larger than the first step size. The peak detector circuit 56 also includes a summation circuit 74 for providing a tracking signal, PEAKDAC, as a sum of the first and second output signals 64, 72, respectively.

The DIFF signal is coupled to a non-inverting input of a first comparator 78 which receives, at an inverting input, the PEAKDAC signal, and which generates a COMPOUT signal in response. The DIFF signal is further coupled to a non-inverting input of a second comparator 76 which receives, at an inverting input, the PEAKDAC signal, and which generates a POSCOMP signal in response. The second comparator 76 has hysteresis, here on the order of 100 mV, so that the POSCOMP signal changes state when the DIFF signal differs from the PEAKDAC signal by approximately 100 mV. The first comparator 78 also has hysteresis, here on the order of 10 mV, so that the COMPOUT signal changes state when the DIFF signal differs from the PEAKDAC signal by approximately 10 mV.

The output signal, COMPOUT, of the first comparator 78, is coupled to an exclusive OR (XOR) gate 82 which additionally receives the POSCOMP signal and which provides a HOLD input signal to the first counter 58, preventing the first counter 58 from counting when the HOLD signal state is high. The second counter 68 also receives a HOLD input signal, but by other paths described more fully below. The first and second counters 58, 68, respectively, are further responsive to a clock signal, CLK, and to the POSCOMP signal, which is coupled to UP/DN inputs of the first and second counters 58, 68, for controlling whether the counters 58, 68, count up or down.

The PEAKDAC tracking signal is also applied to an inverting input of a third comparator 80. A non-inverting input of the third comparator 80 receives, via a multiplexer 84, a DIFF+ signal when the POSCOMP signal is in a high state and a DIFF− signal when the POSCOMP signal is in a low state. Offset generator 88 generates the DIFF+ signal corresponding to the DIFF magnetic field signal, but offset by a predetermined positive voltage, and offset generator 86 generates the DIFF− signal corresponding to the DIFF magnetic field signal, but offset by a predetermined negative voltage. An XNOR gate 90 receives the POSCOMP signal and the output of the third comparator 80 and provides a TOO-FAR-BEHIND signal, which is indicative of the PEAKDAC tracking signal lagging to far behind the DIFF magnetic field signal.

The TOO-FAR BEHIND signal being in a high state is indicative of a relatively rapidly changing DIFF magnetic field signal, and an interval during which the PEAKDAC tracking signal is unable to keep up with the DIFF signal. The TOO-FAR BEHIND signal being in a low state is indicative of a relatively slowly changing DIFF magnetic field signal, and an interval during which the PEAKDAC tracking signal is able to keep up with the DIFF signal. As described more fully below, a TOO-FAR BEHIND signal being in a low state is associated with a first mode of operation and a TOO-FAR BEHIND signal being in a high state is associated with a second mode of operation.

In operation, the peak detector 56 is responsive to the magnetic field signal, DIFF, and provides the tracking signal, PEAKDAC, which substantially follows at least a portion of the magnetic field signal, DIFF. The peak detector 56 provides the output signal, POSCOMP, which changes state when the PEAKDAC signal differs by a predetermined fixed amount from the peaks and also the valleys of the magnetic field signal, DIFF.

The first and second counters 58, 68 are coupled to a variety of control signals that provide two modes of operation. In the first mode of operation, corresponding to a low TOO-FAR-BEHIND signal, the first and second counters 58, 68, respectively, act as one continuous, higher order counter, for which the first counter 58 increments by one (i.e., with a "fine" bit) in response to each cycle of the CLK signal and the second counter 68 increments by one (i.e., with a "coarse" bit) each time that the first counter 58 reaches a terminal count. For example, if the first counter 58 is an eight-bit counter having a terminal count of 255, at the next cycle of the CLK signal, the first counter resets to a zero count, while providing a CARRY signal to the second counter 68. The CARRY signal is coupled through a gate 60b to a BORROW input of the second counter 68, which, only in the first mode of operation, receives the CARRY signal. The CARRY signal also operates to temporarily remove the HOLD signal from the second counter 68 via gate 60c. Therefore, in response to the CLK signal, upon the occurrence of a CARRY signal, provided upon a terminal count of the first counter 58, the second counter 68 increases its count by one, while the first counter 58 resets to a count of zero.

In the second mode of operation, corresponding to a high TOO-FAR-BEHIND signal, both the first and the second counters 58, 68, respectively, count on each cycle of the CLK signal. Essentially, in the second mode of operation, the second counter 68 provides one or more additional counts or coarse bits to the coarse DAC 70, therefore causing the PEAKDAC signal to move more rapidly toward the DIFF signal. The second mode of operation is achieved by removal of the HOLD signal from the second counter 68 upon generation of a high level TOO-FAR-BEHIND signal, via the gate 60c.

In one particular embodiment, a voltage step of the second output signal 72 is made to be smaller than a total of the range of voltage steps of the first output signal 64. In this way, the PEAKDAC signal, a sum of the first and second output signals 64, 72, respectively, has a resolution no greater than one fine bit. This can be achieved by scaling the coarse DAC 70 to respond to a step of the second counter 68 with an output voltage step less than the fine DAC 62 response to a full range of counts of the first counter 58. As a result, at each step of the second output signal 72, the PEAKDAC signal may step in a direction opposite from the steps provided by the first output signal 64. This effect will become more apparent in conjunction with figures below.

It should be understood that, having the two DACs, a resolution is obtained which is greater than the resolution of either one of the two DACs. For example, in one particular embodiment, the fine DAC 62 is an eight-bit DAC and the coarse DAC 70 is a four-bit DAC, resulting in nearly twelve bits of resolution. Also, in this particular embodiment, having the largest DAC be eight bits rather than twelve bits, fast conversion times comparable to those of an eight-bit DAC are achieved, yet with the nearly twelve bits of resolution.

As described above, in one particular embodiment, the fine DAC 62 is an eight-bit DAC and the coarse DAC 70 is a four-bit DAC. However, in other embodiments, the fine DAC 62 can have fewer than eight bits or more than eight bits and the coarse DAC 70 can have more than four bits or fewer than four bits. The first counter 58 can have a number of bits in accordance with the number of bits of the fine DAC 62 and the second counter 68 can have a number of bits in accordance with the number of bits of the coarse DAC 70.

One of ordinary skill in the art will understand how the gates 60a–60c generate control signals to provide the above-described first and second modes of operation. While particular gates 60a–60c are shown, it should be recognized that other gates and other circuit arrangements can accomplish the same function. Furthermore, the gates 60a–60c can be embodied in a variety of hardware, including, but not limited to, a field programmable gate array, a mask programmable gate array, a custom digital circuit, and a firmware programmable circuit.

Figure 4:
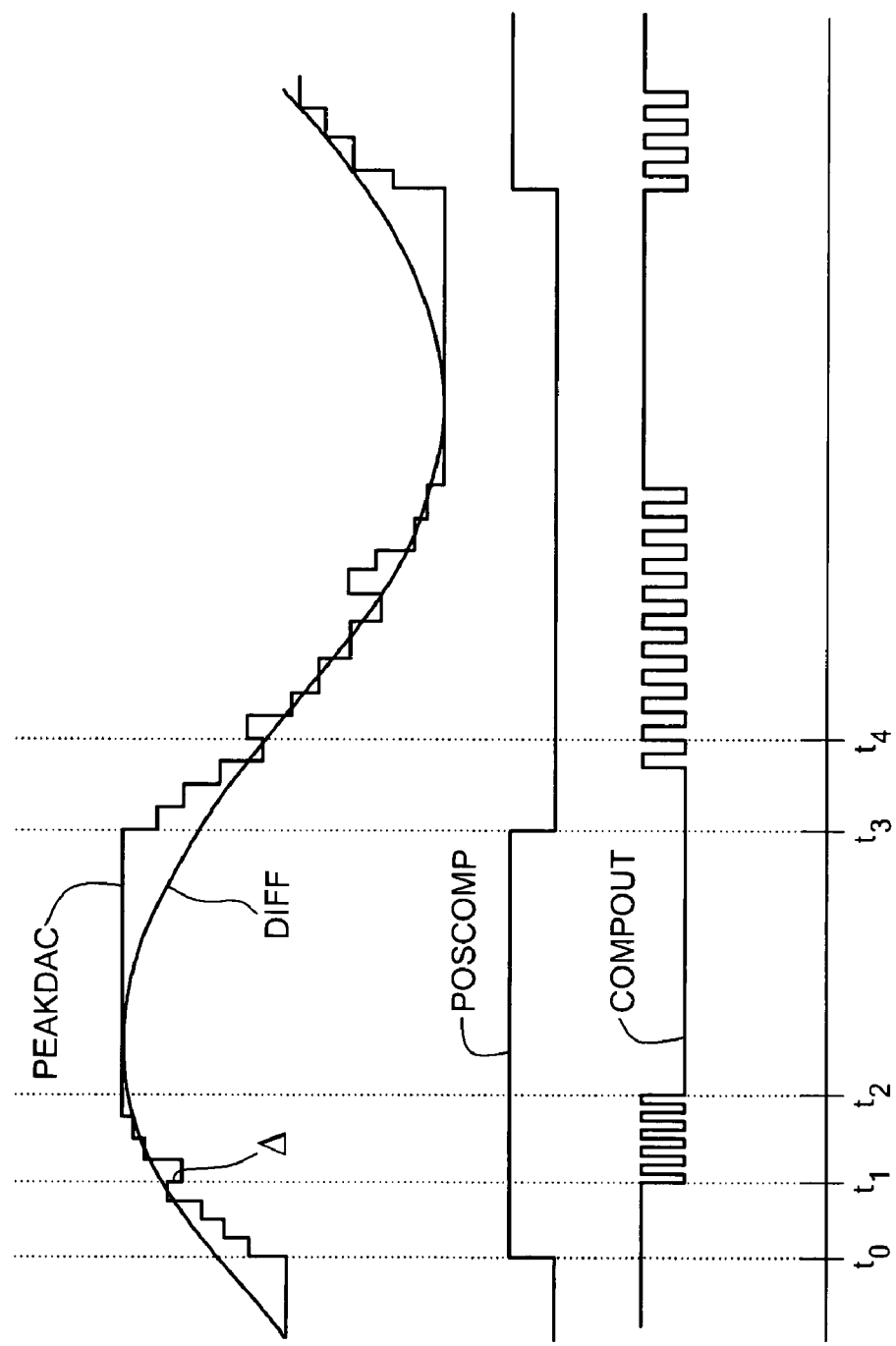
FIG. 4 shows signal waveforms associated with the Hall effect proximity detector of FIG. 3 when operating with a relatively slowly changing magnetic field signal.
Figure 5:
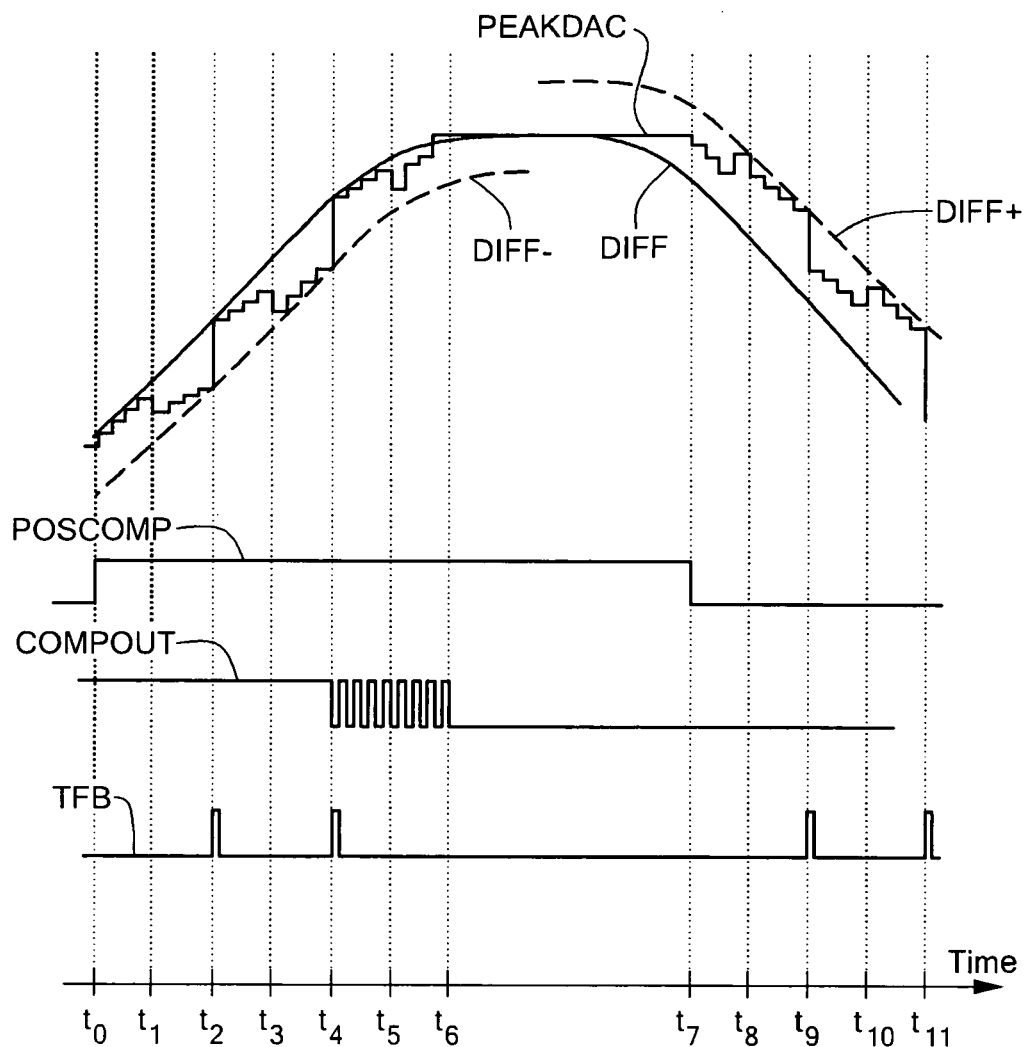
FIG. 5 shows signal waveforms associated with the Hall effect proximity detector of FIG. 3 when operating with a relatively rapidly changing magnetic field signal.

Referring now to FIG. 4, waveforms associated with the above-described first mode of operation are shown, wherein the first and second counters 58, 68, respectively, (FIG. 3) operate as one continuous counter. The first mode of operation, described above, is provided when the TOO-FAR-BEHIND signal is in a low state, and the second mode of operation, described more fully below in conjunction with FIG. 5, is provided when the TOO-FAR-BEHIND signal is in a high state.

For clarity, here it is shown that the first counter 58 is only a two-bit counter having four output levels. As described above, upon reaching the terminal count at the fourth count, the second counter 68 counts by one and the first counter 58 resets to a zero. As shown, whenever the DIFF signal exceeds the PEAKDAC signal by the hysteresis level of the first comparator 78 (FIG. 3), such as by 10 mV, the COMPOUT signal transitions to a logic high level, thereby causing the first counter 58 (FIG. 3) to count if the POSCOMP signal is also high. Once the first counter 58 counts up one step, the COMPOUT signal goes low causing the count value of the first counter 58 to be held until the DIFF signal exceeds the PEAKDAC signal by 10 mV again. At a time $t_1$, the first counter 58 reaches its terminal count of four, and the second counter is then incremented by one. At time $t_1$ it can be seen that the PEAKDAC signal can step downward in voltage as the second counter 68 increments by one and the first counter 58 resets to a count of zero, due to the above-described scaling of the coarse DAC steps relative to the entire range of the fine DAC.

As described above in conjunction with FIG. 3, the coarse DAC 70 is scaled to provide the above-described response. As is known, DACs are designed to be monotonic, but each step can be of a different size, typically having a variation of as much as one half of a desired step size. If the peak detector circuit 56 (FIG. 3) were designed to provide a step from the coarse DAC 70 equal to the full range of the fine DAC 62 (FIG. 3), in some cases the resulting step from the coarse DAC 70 would be half of a coarse step beyond the desired step and a loss of resolution would result. Therefore, in one particular embodiment, the coarse DAC 70 is designed to have a step size smaller than the full range of the fine DAC 62, which can result in a negative voltage step when the coarse DAC 70 is incremented by the second counter 68. However, due to the above-mentioned typical variation of the step size of a DAC, when the coarse DAC 70 is incremented, a reverse voltage step does not necessarily result. Instead the transition of the PEAKDAC signal when the course DAC is incremented can be sometimes positive, but should be a step no greater than a step provided by the fine DAC 62. In one particular embodiment, the coarse DAC 70 has a nominal step size which is approximately sixty-seven percent, or two-thirds, of the full range of the fine DAC 62.

When the DIFF signal reaches a positive peak, as occurs at time $t_2$, the PEAKDAC signal stays above the DIFF signal, thereby causing the HOLD input to the first counter 58 to be asserted until the hysteresis of the second comparator 76 has been overcome, as occurs when the POSCOMP signal goes low, just before time $t_3$.

Figure 1:
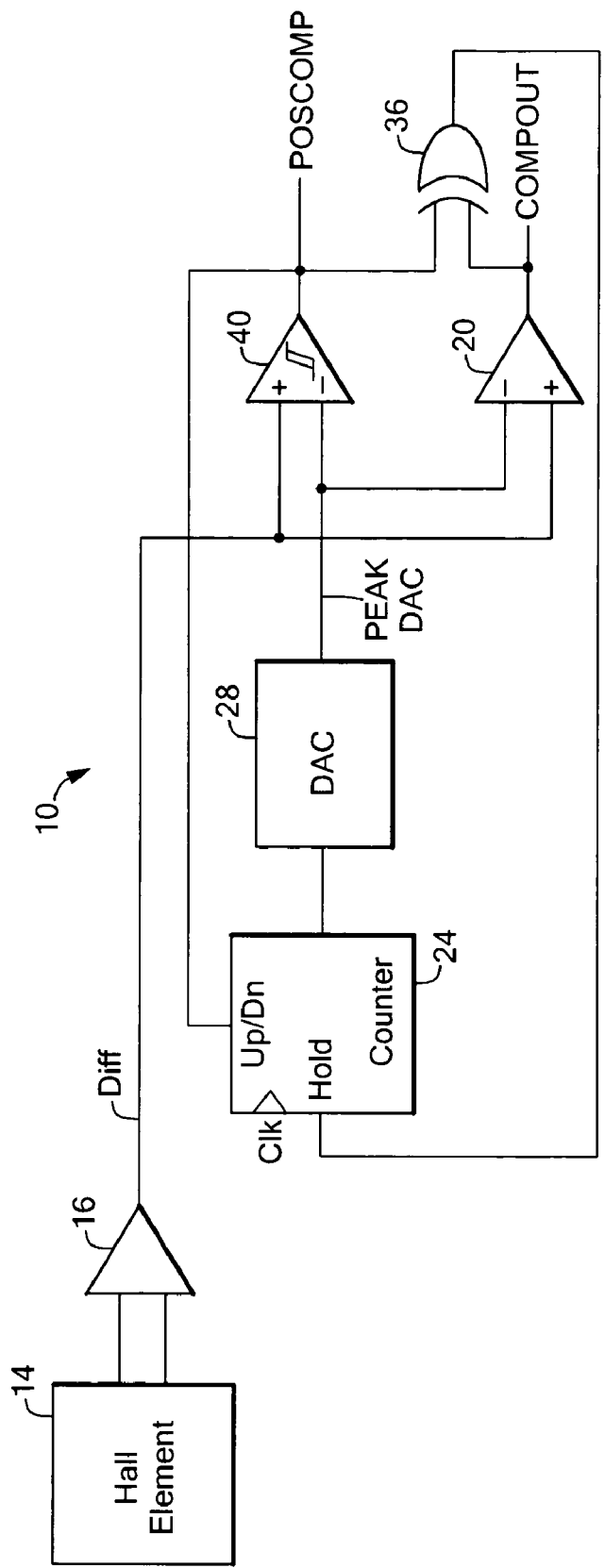
FIG. 1 is a block diagram of a prior art Hall effect proximity detector.
Figure 2:
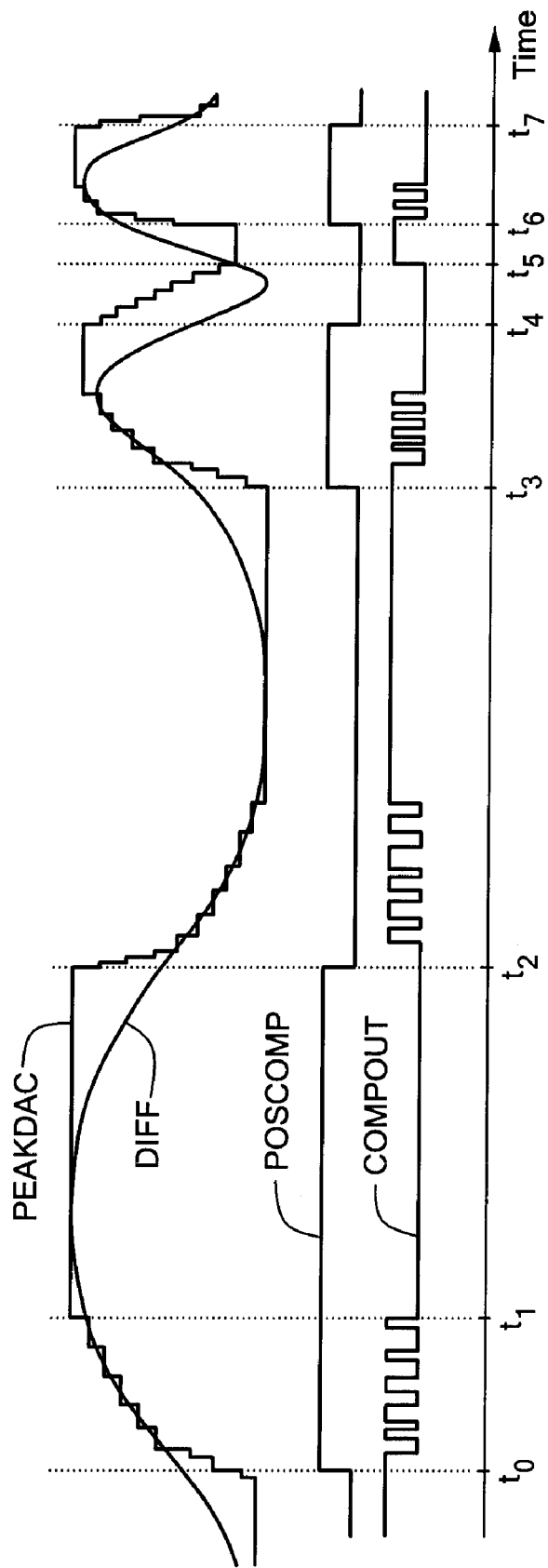
FIG. 2 shows signal waveforms associated with the Hall effect proximity detector of FIG. 1.

It will be recognized that aspects of the first mode of operation shown in FIG. 4 resembles the operation shown in FIG. 2 for the first cycle of the DIFF signal. However, like the operation shown for other cycles of the DIFF signal in FIG. 2, the first mode of operation of the present invention also may not be able to keep up with a rapidly changing DIFF signal.

Referring now to FIG. 5, the above-described second mode of operation is shown, wherein at some times, the second counter 68 provides one or more additional counts, therefore causing the PEAKDAC signal to move more rapidly. Again, for clarity, it is shown that the first counter 58 (FIG. 3) operates as only a two-bit counter having four output levels.

Only a half cycle of the DIFF signal and the corresponding PEAKDAC signal is shown. Whenever the DIFF signal exceeds the PEAKDAC signal by the hysteresis level of the first comparator 78, such as by 10 mV, the COMPOUT signal transitions to a logic high level, thereby causing the first counter 58 to count if the POSCOMP signal is also high. Between times $t_0$ and $t_2$, the PEAKDAC signal is generated in much the same fashion as described above in conjunction with FIG. 4. However, the PEAKDAC signal falls progressively more behind the DIFF signal from times $t_0$ to $t_2$, until it reaches a level of DIFF–, at a predetermined offset from the DIFF signal, at time $t_2$. At time $t_2$, the TOO-FAR-BEHIND signal (also see FIG. 3) changes to a high state removing the HOLD input to the second counter 68 (FIG. 3), and the PEAKDAC signal takes a large step, bringing it closer to the DIFF signal. This large step at time $t_2$ corresponds to a coarse step provided by the second counter 68 (FIG. 3) and the coarse DAC 70 (FIG. 3), irrespective of a terminal count of the first counter 58 (FIG. 3). The large step at time $t_2$ coincides with a high state of the TOO-FAR-BEHIND signal. The TOO-FAR-BEHIND signal changes state when the PEAKDAC signal deviates from the DIFF signal by the predetermined amount, i.e., when the DIFF signal is rising, this condition corresponds to the PEAKDAC signal meeting the DIFF– level. A high state of the TOO-FAR-BEHIND signal causes the peak detector circuit 56 to provide the second mode of operation.

The COMPOUT signal remains high during the period from time $t_0$ to $t_4$. Just after time $t_4$, the PEAKDAC signal essentially catches up with the DIFF signal, by way of a step of the coarse DAC 70, and the TOO-FAR BEHIND signal changes to a low state, providing the first mode of operation described above in conjunction with FIG. 4. In the time period from $t_4$ to $t_6$, the peak detector circuit 56 of FIG. 3 has a behavior similar to that shown in FIG. 4. At a time $t_5$, the first counter 58 reaches its terminal count of four, and the second counter 68 is then incremented by one. At times $t_1$, $t_3$, and $t_5$ it can be seen that the PEAKDAC signal can step downward in voltage as the second counter 68 increments by one, as described in conjunction with FIG. 4. After time $t_6$, the COMPOUT signal transitions to a low state causing the count value of the first counter 58 to be held until the DIFF signal exceeds the PEAKDAC signal by 10 mV again.

Figure 6:
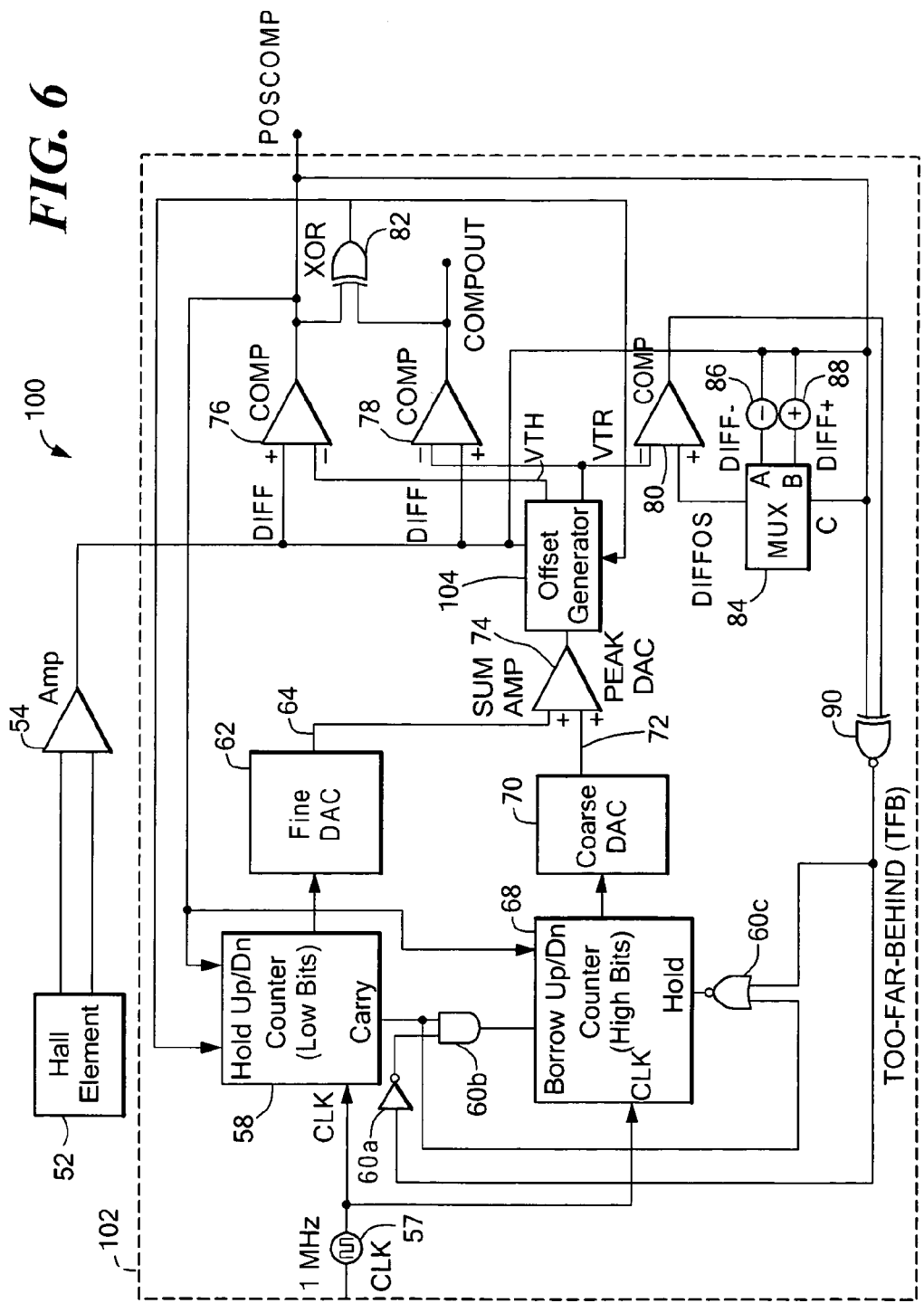
FIG. 6 is a block diagram of another Hall effect proximity detector including two counters and two DACS and having an offset generator according to the present invention.

Referring now to FIG. 6, in which like elements of FIG. 3 are shown having like reference designations, a proximity detector 100 includes a peak detector circuit 102 having an offset generator 104 adapted to generate two signals related to the PEAKDAC signal, but each having a DC offset with respect to the PEAKDAC signal. One of two signals VTH and VTR is offset from the PEAKDAC signal by a predetermined positive voltage, and the other one of the two signals VTH and VTR is offset from the PEAKDAC signal by a predetermined negative voltage.

The proximity detector 100 of FIG. 6 differs from the proximity detector 50 of FIG. 3 in the addition of the offset generator 104. The offset generator 104 generates the VTH threshold signal for coupling to the second comparator 76 and also generates the VTR tracking signal for coupling to first comparator 78.

It should be understood that various circuitry is suitable for providing the offset generator 104. For example, circuitry shown in the above-identified U.S. patent application entitled PROXIMITY DETECTOR, filed on May 28, 2002, and assigned application Ser. No. 10/156,684, shows examples of suitable offset generator circuits.

The second comparator 76 receives, in addition to the DIFF signal, the threshold signal, VTH, and provides the POSCOMP output signal at its output. The first comparator 78 receives, in addition to the DIFF signal, the VTR tracking signal from the offset generator 102, and provides at its output the COMPOUT signal.

Figure 7:
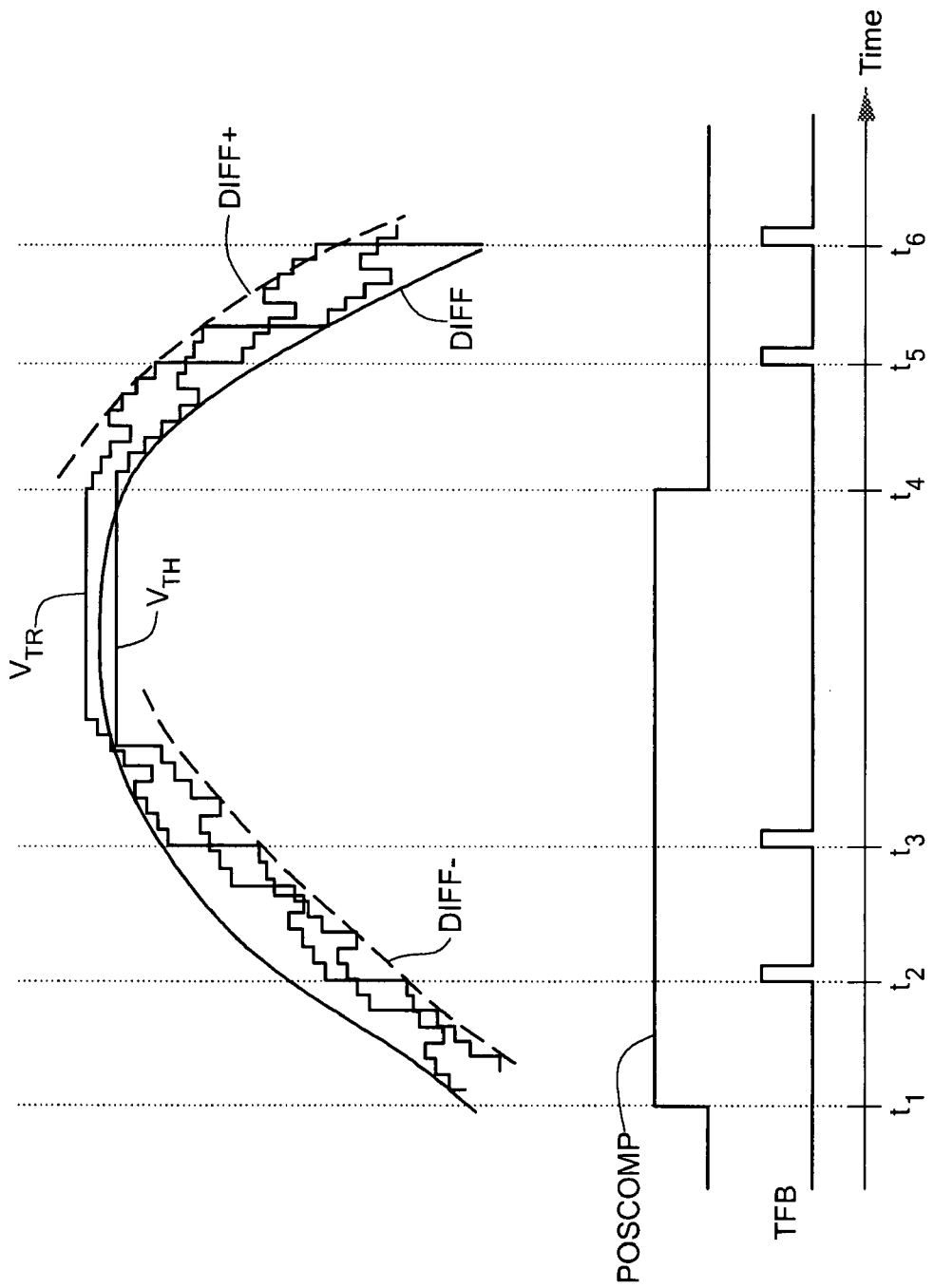
FIG. 7 shows signal waveforms associated with the Hall effect proximity detector of FIG. 6 when operating with a relatively rapidly changing magnetic field signal.

Referring now to FIG. 7, the VTR and VTH signals of FIG. 6 are shown for one-half cycle in relation to an illustrative DIFF signal. Also shown is the POSCOMP signal. When the POSCOMP signal is in a first logic state (e.g., high between times $t_1$ and $t_4$), the VTR tracking signal is above the VTH threshold signal. When the POSCOMP signal is in a second logic state (e.g., low between a time $t_4$ and another time (not shown), the VTR tracking signal is below the VTH threshold signal. Stated differently, the VTH threshold signal and the VTR tracking signal are interchanged when the POSCOMP signal changes state. With this arrangement, the VTR tracking signal is forced toward, and therefore closely follows the DIFF signal near the times corresponding to transitions of the POSCOMP signal, e.g., at the times $t_1$ and $t_4$. However, for rapidly changing magnetic fields, at times away from the times $t_1$ and $t_4$, the VTR signal cannot keep up with the rapidly changing DIFF signal, and the VTR signal moves progressively away from the DIFF signal which it attempts to track.

Between the times $t_1$ and $t_2$, whenever the VTR signal moves apart from the DIFF signal sufficiently far to intercept the DIFF− threshold (e.g., at times $t_2$ and $t_3$) (also see FIG. 5), the TOO-FAR-BEHIND signal changes temporarily to a high state, resulting in the second mode of operation in which the coarse DAC 70 makes a coarse step, and between the times $t_4$ and another time (not shown), whenever the VTR signal intercepts the DIFF+ threshold (e.g., at times $t_5$ and $t_6$), again the TOO-FAR-BEHIND signal changes temporarily to a high state in which the coarse DAC 70 again makes a coarse step, bringing the VTR signal closer to the DIFF signal.

Having described the preferred embodiments of the invention, it will now become apparent to one of ordinary skill in the art that other embodiments incorporating their concepts may be used. For example, it will be appreciated by those of ordinary skill in the art that various circuits can be used for introducing an offset voltage to the DIFF signal and to the VTR tracking signal for the purpose of bringing these signal levels towards each other at transitions of the POSCOMP signal. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A proximity detector, comprising:
    a magnetic-field-to-voltage transducer for providing a magnetic field signal indicative of an ambient magnetic field;
    a peak detector responsive to said magnetic field signal for providing a tracking signal which substantially follows at least a portion of said magnetic field signal, wherein said peak detector comprises:
        a first digital-to-analog converter for providing a first output signal having a first step size;
        a second digital-to-analog converter for providing a second output signal having a second step size larger than said first step size; and
        a summation circuit coupled to said first and said second digital-to-analog converters for providing said tracking signal as a sum of said first and said second output signals, wherein said tracking signal is controlled to include steps associated with the first step size when said magnetic field signal varies from said tracking signal by less than a predetermined amount and to include larger steps associated with the second step size when said magnetic field signal varies from said tracking signal by more than the predetermined amount.

2. The proximity detector of claim 1, further including a too-far-behind comparator for providing a too-far-behind signal which changes state when said magnetic field signal varies from said tracking signal by the predetermined amount, wherein said tracking signal is controlled in response to said too-far-behind signal to include steps associated with the first step size when the too-far-behind signal is in a first state and to include larger steps associated with the second step size when the too-far-behind signal is in a second state.

3. The proximity detector of claim 2, wherein said peak detector further comprises:
    a first counter for providing a first count signal to said first digital-to-analog converter; and
    a second counter for providing a second count signal to said second digital-to-analog converter.

4. The proximity detector of claim 3, wherein in response to the first state of said too-far-behind signal said second counter is stepped in association with a terminal count of said first counter, and in response to the second state of said too-far-behind signal said second counter is also stepped.

5. The proximity detector of claim 2, wherein said too-far-behind comparator is responsive to an offset signal that differs from said magnetic field signal by an offset amount.

6. The proximity detector of claim 1, further including a POSCOMP comparator for providing a POSCOMP signal, which changes state when said magnetic field signal varies from said tracking signal by a second predetermined amount, wherein said tracking signal is forced towards said magnetic field signal in response to changes in state of said POSCOMP signal.

7. The proximity detector of claim 6, wherein said POSCOMP comparator is responsive to a threshold signal that differs from said tracking signal by the second predetermined amount.

8. The proximity detector of claim 6, wherein said tracking signal is brought to substantially the same level as said magnetic field signal in response to changes in state of said POSCOMP signal.

* * * * *

UNITED STATES PATENT AND TRADEMARK OFFICE
CERTIFICATE OF CORRECTION

| | | |
|---|---|---|
| PATENT NO. | : 7,199,579 B2 | Page 1 of 2 |
| APPLICATION NO. | : 10/795930 | |
| DATED | : April 3, 2007 | |
| INVENTOR(S) | : Scheller et al. | |

It is certified that error appears in the above-identified patent and that said Letters Patent is hereby corrected as shown below:

Title Page, item [57] Abstract, line 4 delete "two mode" and replace with --two modes--.

Title Page, item [57] Abstract, line 5 delete "operation the" and replace with --operation, the--.

Column 3, line 28 delete "two mode" and replace with --two modes--.

Column 3, line 29 delete "operation the" and replace with --operation, the--.

Column 5, line 7 delete "TOO-FAR BEHIND" and replace with --TOO-FAR-BEHIND--.

Column 5, line 11 delete "TOO-FAR BEHIND" and replace with --TOO-FAR-BEHIND--.

Column 5, line 15 delete "TOO-FAR BEHIND" and replace with --TOO-FAR-BEHIND--.

Column 5, line 17, delete "TOO-FAR BEHIND" and replace with --TOO-FAR-BEHIND--.

Column 6, line 60 delete "At time $t_1$ it" and replace with --At time $t_1$, it--.

Column 8, line 6 delete "TOO-FAR BEHIND" and replace with --TOO-FAR-BEHIND--.

UNITED STATES PATENT AND TRADEMARK OFFICE
CERTIFICATE OF CORRECTION

PATENT NO. : 7,199,579 B2
APPLICATION NO. : 10/795930
DATED : April 3, 2007
INVENTOR(S) : Scheller et al.

It is certified that error appears in the above-identified patent and that said Letters Patent is hereby corrected as shown below:

Column 8, line 13 delete "$t_5$ it" and replace with --$t_5$, it--.

Signed and Sealed this

Twenty Second Day of April, 2008

JON W. DUDAS
*Director of the United States Patent and Trademark Office*